United States Patent [19]
Drennen et al.

[11] Patent Number: 6,024,422
[45] Date of Patent: Feb. 15, 2000

[54] LARGE DISPLACEMENT VARIABLE PITCH SCREW-DRIVEN SYSTEM

[75] Inventors: David Bernard Drennen; Gustavus Pearl Bock, both of Bellbrook; Ryan Lovell Wright, Dayton, all of Ohio

[73] Assignee: General Motors Corporation, Detroit, Mich.

[21] Appl. No.: 08/857,957

[22] Filed: May 16, 1997

[51] Int. Cl.[7] .................................................. B60T 8/42

[52] U.S. Cl. ........................ 303/115.2; 60/538; 60/545; 74/567; 74/569

[58] Field of Search ........................... 303/115.2, 116.4, 303/113.2; 188/82.77, 162; 60/538, 545, 574; 74/569, 567; 92/32

[56] References Cited

U.S. PATENT DOCUMENTS

| | | | |
|---|---|---|---|
| 3,420,580 | 1/1969 | Dymond | 303/21 |
| 4,653,815 | 3/1987 | Agarwal et al. | 303/100 |
| 4,938,543 | 7/1990 | Parker et al. | 303/113.2 |
| 5,026,126 | 6/1991 | Umasankar et al. | 303/115.2 |
| 5,147,118 | 9/1992 | Reuter et al. | 303/115.2 |
| 5,246,283 | 9/1993 | Shaw et al. | 303/115.2 |
| 5,439,278 | 8/1995 | Tsukamoto et al. | 303/115.2 |
| 5,454,631 | 10/1995 | Frieling et al. | 303/115.2 |
| 5,667,283 | 9/1997 | Drennen et al. | 303/115.2 |

*Primary Examiner*—Robert J. Oberleitner
*Assistant Examiner*—Pamela J. Lipka
*Attorney, Agent, or Firm*—Robert M. Sigler

[57] ABSTRACT

A variable pitch screw-driven system includes a rotatable drive screw powered by a motor actuator. A cam sleeve includes a nut section and is disposed about the drive screw and is linearly translatable in response to rotation of the drive screw. The cam sleeve includes a cam track with a fixed cam follower positioned to travel within a cam track. Linear translation of the cam sleeve is altered by tracking of the cam follower within the cam track such that rotation of the cam sleeve is effected simultaneously with rotation of the drive screw resulting in an effective variable pitch of the variable pitch screw-driven system wherein linear translation of the cam sleeve results from both rotation of the drive screw and rotation of the cam sleeve.

11 Claims, 2 Drawing Sheets

LARGE DISPLACEMENT VARIABLE PITCH SCREW-DRIVEN SYSTEM

RELATED APPLICATIONS

This application is related to commonly assigned application, U.S. Ser. No. 08/632,189, filed Apr. 15, 1996, now U.S. Pat. No. 5,667,283.

TECHNICAL FIELD

The present invention relates to a large displacement variable pitch screw-driven system and more particularly, to a variable pitch screw-driven cam advanced system that is applicable to pressure modulation systems and is adaptable to large displacement requirements.

BACKGROUND OF THE INVENTION

Screw-driven systems for effecting a desirable pressure change in a braking system are well known devices. U.S. Pat. No. 4,653,815 which issued Mar. 31, 1987 describes one such device. The use of such a motor driven screw to effect translation of a piston that in-turn, effects a corresponding increase or decrease in fluid pressure contained within a closed braking circuit is well known.

In using such a conventional screw-driven system for effecting brake pressure modulation in wheel brake applications or releases, resulting system pressure gradients are important. A significant amount of development has concentrated on provided a motor actuator that operates to enable generation of the pressures and response times required while meeting energy limitation requirements using the now conventional screw-driven technology.

Such motor actuated screw-driven systems have proven particularly successful for use in the application and release of fluid pressure in braking systems. However, this success has resulted in the use of motor actuators that require significant amounts of energy to operate and are somewhat costly.

Electrical power consumption has become increasingly more significant as braking systems find application in electric powered vehicles in addition to the more prevalent internal combustion engine powered vehicles. Accordingly, improvements in screw-driven systems generally, and for use in vehicle braking systems in particular, would benefit from potential improvements resulting in possibly lower energy consumption requirements.

In the pressurization of a braking system during full braking cycles, it has been found that the actual forces required of the screw-driven system are variable. During initial braking system pressurization, low forces are encountered as brake pads begin to contact their corresponding rotor or shoe and as compliance of hoses in the braking lines is accounted for. During this period of brake application, high fluid flow conditions under relatively low pressures are encountered. Subsequently, as the brake pads begin to fully contact the rotors or drums and compliance is overcome, relatively high pressures, often exceeding 2000 pounds per square inch, are encountered. During this latter period of brake application, relatively lower amounts of fluid flow are required.

In order to meet the requirements for these two functionally different periods of brake application, a screw-driven system must be capable of effecting translation of the piston in a manner resulting in high fluid flow conditions under relatively low pressure while at the same time operating under lower fluid flow conditions and significantly higher pressures.

SUMMARY OF THE INVENTION

The present invention provides a variable screw-driven system to generate the required pressure and response times effectively and efficiently during apply and release fluid pressurization cycles for operation in applications such as vehicle braking systems. The screw driven system utilizes a fixed-base screw pitch for basic linear nut movements. In a preferred use of the present invention, a nut section is connected to a piston for effecting volumetric changes in a closed loop vehicle braking system wherein the piston generally translates in a linear direction. The nut section is part of a cam sleeve that includes a cam track which is guided by a stationary cam follower. When a motor actuator is used to rotate the drive screw, the cam sleeve responds by translating in the linear direction. Simultaneously, the cam sleeve is guided by the cam follower that rides in the cam track causing the cam sleeve to selectively rotate in response. The cam track can be designed to result in relatively complex effective screw pitch results from the screw driven system.

In a preferred application of the present invention, simultaneous linear translation and rotation of the cam sleeve results in an effective screw pitch that is tailorable to optimum braking system pressurization requirements. The effective screw pitch is changed by cam sleeve rotation simultaneously with drive screw rotation. As the cam sleeve translates in the linear direction, the cam track and cam follower operate to result in an increase or decrease in the effective dynamic screw pitch.

As a result, the variable screw-driven system is adapted to provide relatively rapid linear translation of a piston when system requirements include relatively high fluid flow conditions and is designed to result in relatively slower linear translation of the piston as fluid flow conditions lessen and operating pressures increase.

DETAILED DESCRIPTION OF THE PRESENTLY PREFERRED EMBODIMENT

Figure 1:
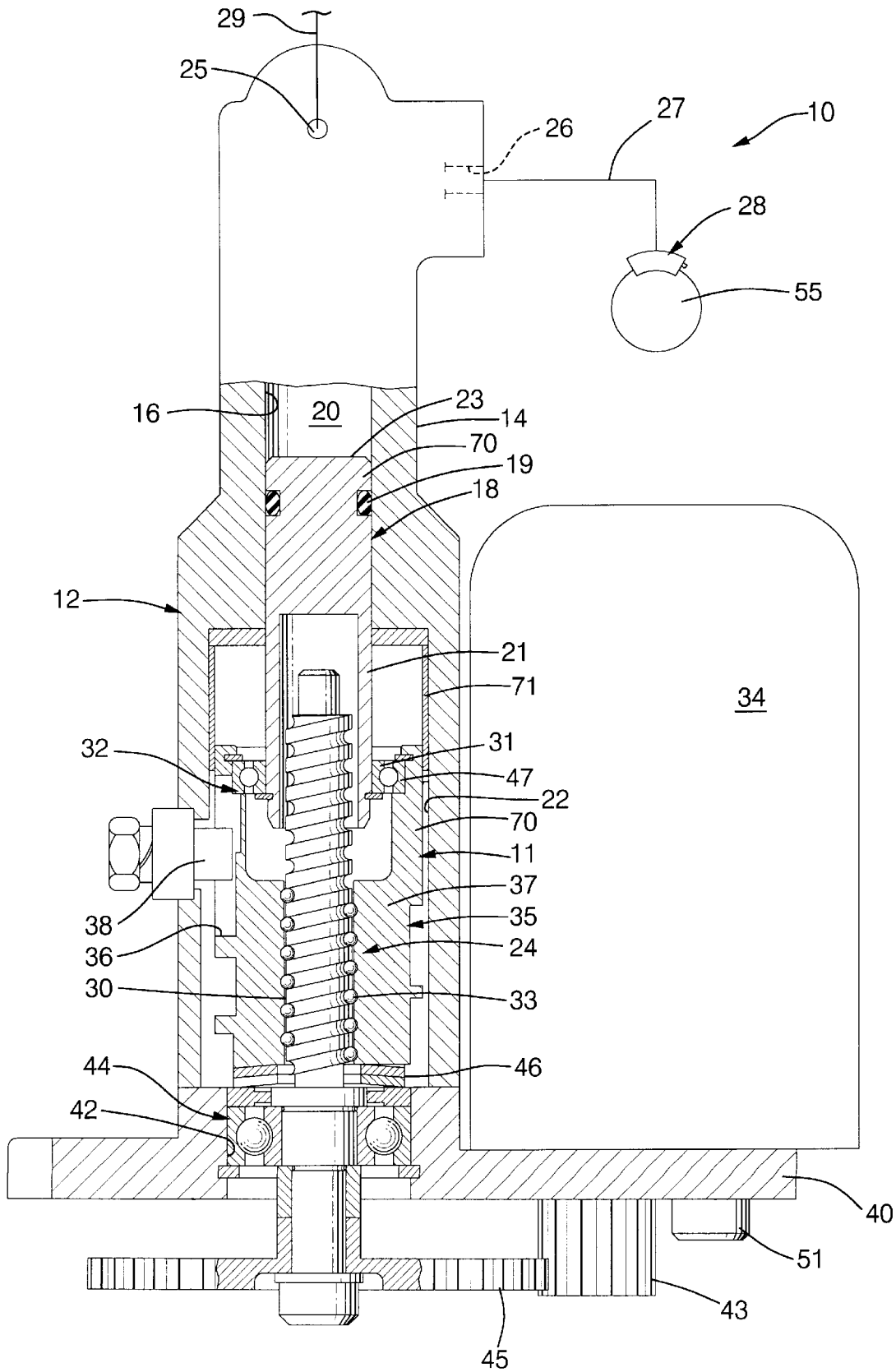
FIG. 1 is a fragmentary cross sectional illustration of a variable screw-driven system.

Referring to the drawings, illustrated in FIG. 1 is a variable screw-driven system embodied in a vehicle braking system designated in the aggregate as 10. Braking system 10 includes modulator 12 which is disposed between a wheel brake 28 and a master cylinder (not illustrated), through the brake line 29. The modulator 12 communicates with the wheel brake 28 through port 26 and brake line 27. The modulator 12 communicates with the master cylinder through port 25 and brake line 29. The master cylinder can be selectively isolated from the modulator 12 by means of selectively closeable valve (not shown), disposed in the brake line 29 or provided as part of the modulator 12 as is conventionally known in the art.

The modulator 12 includes a body 14 within which stepped longitudinal bore 16 is defined. A piston assembly 18 is slidably disposed in stepped longitudinal bore 16. The piston assembly 18 assists in defining a chamber 20 within the stepped longitudinal bore 16. The chamber 20 communicates through the brake line 27 with the wheel brake 28 and through the brake line 29 with the master cylinder. When the master cylinder is selectively isolated from the chamber 20, any volumetric changes of the chamber 20 effected by translation of the piston assembly 18 within the stepped longitudinal bore 16 result in a corresponding pressure increase or decrease in the chamber 20, which is communicated through the brake line 27 to the wheel brake 28. Therefore, the modulator 12, by means of linear translation of piston assembly 18, effects application action or release action of the wheel brake 28 by a selective pressure increase or decrease effected in the chamber 20.

Linear translation of the piston assembly 18 is provided through operation of variable pitch screw-driven mechanism 11. Variable pitch screw-driven mechanism 11 includes a threaded shaft designated as drive screw 30. Drive screw 30 extends into the body 14 of modulator 12 and is substantially axially centered in the stepped longitudinal bore 16. The drive-screw 30 is rotatably supported by bearing assembly 44 which is fixed in segment 42 of stepped longitudinal bore 16. Bi-directional rotation of drive screw 30 is effected by motor actuator 34 which engages drive screw 30 through gears 43 and 45. Motor actuator 34 is fixed on mounting base 40 of body 14 by means of a plurality of fasteners such as fastener 51.

Piston assembly 18 carries a seal 19 to maintain fluid separation between chamber 20 and the remainder of stepped longitudinal bore 16. Piston assembly 18 also includes a piston sleeve 21 which extends over the drive screw 30 and connects to cam assembly 35 which includes a nut section 24. A plurality of ball bearings 33 are engageably carried between the drive screw 30 and the nut section 24. Accordingly, linear translation of the piston assembly 18 within stepped longitudinal bore 16 is effected by rotation of drive screw 30. A plurality of spring washers 46 are positioned between bearing assembly 44 and cam assembly 35 to provide a cushion at the lower end of travel during a pressure reduction mode of the system 10.

Cam assembly 35 is carried about drive screw 30 and includes a cam sleeve 37 that is movable through segment 22 of stepped longitudinal bore 16. A cam follower 38 is fixed to the body 14 and extends into segment 22 of stepped longitudinal bore 16, and is disposed in-part within cam track 36. The cam track 36 is formed in cam sleeve 37. Within the cam assembly 35, the cam follower 38 effects selected rotation of cam sleeve 37 during linear translation thereof, as effected by rotation of drive screw 30. Rotation of the cam sleeve 37 alters the linear translation rate that results from rotation of the drive screw 30.

The cam sleeve 37 is connected to the piston assembly 18 through a bearing assembly 32. The bearing assembly 32 includes concentric inner race 31 and outer race 47 which are engaged through a series of spherical steel balls. The inner race 31 engages the nut section 24 of piston assembly 18 and is held thereon by a retaining ring. The outer race 47 is engaged in a step of cam sleeve 37 and is held therein by a retaining ring. This structure permits relative rotation between the piston assembly 18 and the cam sleeve 37 while maintaining concerted linear translation between the two components.

To effect rotation of the cam sleeve 37 through a generated torque, the cam follower 38 travels through the path dictated by the cam track 36. This occurs during the application of large forces to the top 23 of piston assembly 18 resulting from high fluid pressures in chamber 20. Friction within the piston assembly 18 is reduced to facilitate rotation of nut section 24 and to maintain proper contact between the cam follower 38 and the cam track 36. This is accomplished through the use of the bearing assembly 32 that is incorporated to permit relative rotation between the top 23 of the piston assembly 18 and the nut section 24, resulting in reduced friction therebetween.

Figure 2:
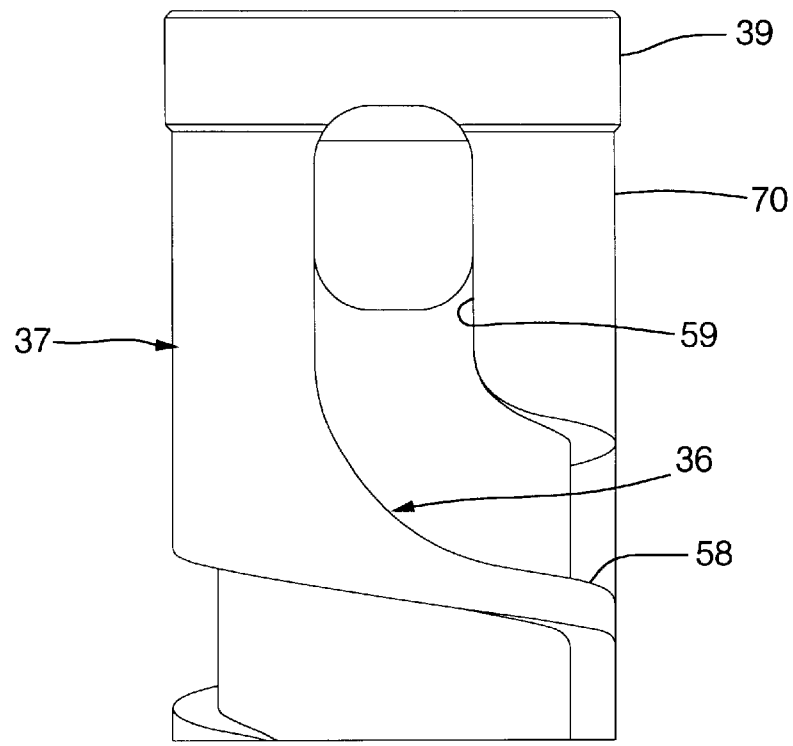
FIG. 2 is a detail illustration of the cam sleeve of the variable screw-driven system of FIG. 1.
Figure 3:
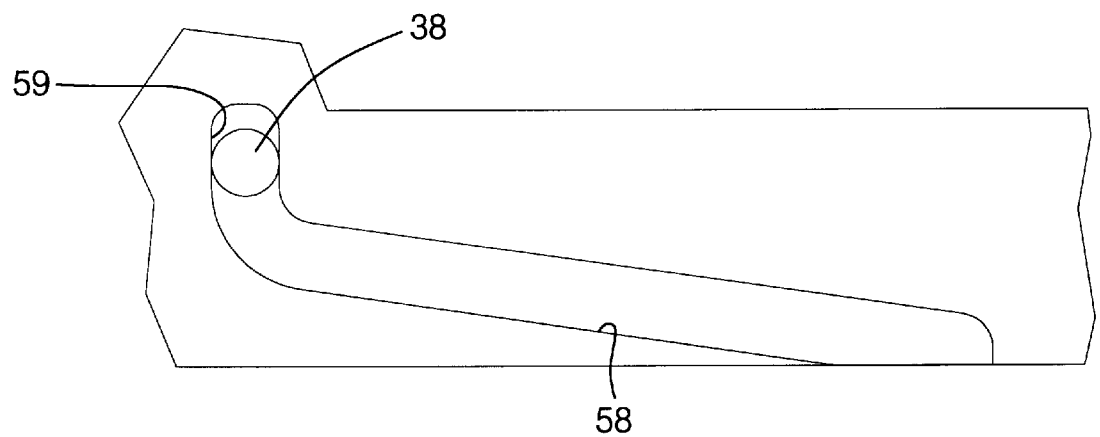
FIG. 3 is an illustration of the cam track profile layout of the cam sleeve of FIG. 2.

The cam sleeve 37 is more clearly shown in FIG. 2, and comprises a cylindrical body 70 with an enlarged upper leg 39 that closely fits within a tubular sleeve 71 that is positioned in the segment 22 of stepped longitudinal bore 16 as seen in FIG. 1. The cam track 36 is formed in the cam sleeve 37 and is designed such that in the present embodiment, during initial translation of the piston assembly 18 in a direction which effects reduction of the volume of chamber 20 and a corresponding brake application action, the incremental linear translation of nut section 24 advances at a relatively high rate due to rotation of the drive screw 30 and the substantially axially disposed orientation of the cam track 36. This part of cam track 36 is designated as substantially axially disposed section 59, and is more readily appreciated through reference to FIGS. 2 and 3. The substantially axially disposed section 59 interacts with the cam follower 38 to substantially prevent rotation of the cam sleeve 37. Therefore, the pitch of the drive screw 30 determines the linear translation rate of the cam sleeve 37. In the present embodiment the pitch of the drive screw 30 is set at 1 inch so that one rotation of the drive screw 30 results in 1 inch of lead.

As linear translation of the piston assembly 18 moves toward its uppermost limit, effective rotational translation of the cam sleeve 37 substantially decreases due to the sloped orientation of the cam track 36. This part of cam track 36 is designated as sloped section 58. Sloped section 58 effects rotation of the cam sleeve 37 and the nut section 24 in a backdriving manner that slows the linear translation of the cam sleeve 37 for a given rate of rotation of the drive screw 30. In the present embodiment, the effective screw pitch is 0.5 inch when the cam follower 38 is in the sloped section 58. The length of the sloped section 58 is set to provide a desired amount of travel at increased torque load capabilities with the reduced screw-pitch. As shown in FIG. 2, greater than 360 degrees of rotation of cam sleeve 37 is provided. Accordingly, a large displacement requirement can be accommodated.

The transition section from substantially axially disposed section 59 to sloped section 58 results in increasingly slower linear translation of the piston assembly 18 for constant revolutions per minute operation of the motor actuator 34 and the drive screw 30 as opposed to when the cam follower 38 is disposed in the substantially axially disposed section 59 of cam track 36. Relative linear translation of the piston assembly 18 is substantially determined solely by the pitch of the drive screw 30 when the cam follower 38 is operating in the substantially axially disposed section 59 of the cam track 36.

The effective screw pitch that results is designed to correspond with the fact that the modulator 12 is actuating wheel brake 28 through the brake line 27. During initial pressurization of the system 10, with the associating master cylinder isolated through braking line 29 from the modulator 12, the wheel brake 28 operates wherein brake pads (not illustrated) begin to contact the rotor 55. With relatively low pressure existing at this point in the brake line 27 and in chamber 20, relatively rapid linear translation of the piston assembly 18 is preferable. Therefore, rotation of the nut section 24 is substantially prevented by means of the cam follower 38. Linear translation in response to rotation of the drive screw 30 by means of the motor actuator 34, acts to effect a relatively rapid linear translation of the piston assembly 18.

Subsequently, during further pressurization of the system 10, as the brake pads come fully into contact with the rotor 55 and pressure begins to build in the braking line 27 and the chamber 20, flow rate is reduced as the cam follower 38 approaches the sloped section 58 of cam track 36. As the cam follower 38 fully enters sloped section 58, linear translation of the piston assembly 18 is effected by rotation of the cam sleeve 37 within the body 14 in addition to rotation of the drive screw 30 by means of motor actuator 34. Rotation of the cam sleeve 37 is in a backdriving direction, to slow linear translation.

The specific profile of the cam track 36 can be modified to effect the desired response in linear translation of the nut section 24 which results in a corresponding linear translation of the piston assembly 18 as shown in FIG. 1. It can be seen that during rotation of the drive screw 30 in a first direction, as the cam follower 38 moves from the substantially axially disposed section 59 to the sloped section 58, linear translation speed of the nut 24 is slowed. Similarly, when the drive screw 30 is rotated in a second direction, opposite to the first direction, as the cam follower 38 moves from the sloped section 58 to the substantially axially disposed section 59, linear translation speed of the nut 24 is increased.

Through means of the modulator 12, a variable screw driven system is provided that has particularly useful application in the brake system 10. In the present embodiment, the cam assembly 35 is tailored to such use. The present invention is not intended to be limited to such application however, and it can be seen that the foregoing description provides details of a variable screw-driven system that is capable of a variety of uses.

What is claimed is:

1. A variable pitch screw-driven system comprising:
   a body;
   a rotatable drive screw in the body;
   a cam sleeve disposed about the rotatable drive screw and including a nut section interacting with the rotatable drive screw through a series of interposed balls, wherein the cam sleeve is linearly translatable in response to rotation of the drive screw;
   a cam track formed in the cam sleeve to travel in concert therewith, and
   a cam follower secured to the body and disposed in the cam track, wherein during rotation of the drive screw, linear translation of the nut section effects tracking of the cam follower within the cam track such that rotation of the cam sleeve is effected simultaneously with rotation of the drive screw resulting in an effective variable pitch of the variable screw-driven system so that linear translation of the cam sleeve is effected by both rotation of the drive screw and by rotation of the cam sleeve and nut section.

2. A variable-pitch screw driven system according to claim 1 further comprising a piston assembly that is linearly translatable in concert with the cam sleeve, the piston assembly including a piston sleeve that extends over the drive screw and engages the cam sleeve.

3. A variable-pitch screw driven system according to claim 2 further comprising a bearing interpositioned between the piston sleeve and the cam sleeve so that the cam sleeve is rotatable relative to the piston assembly.

4. A variable-pitch screw driven system according to claim 3 further comprising a modulator having a bore with a chamber defined in the bore by the piston assembly wherein the piston assembly is linearly translatable in the bore to effect a fluid pressure change in the chamber.

5. A variable-pitch screw driven system comprising:
   a body;
   a drive screw positioned in the body in a reversibly rotatable manner;
   a cam assembly positioned about the drive screw and including a cam sleeve with a nut section wherein a plurality of ball bearings are engagably carried between the drive screw and the nut section so that relative linear translation is effected through rotation of the drive screw, and wherein the cam sleeve includes an outer perimeter surface; and
   a cam follower secured to the body and extending into the cam track wherein linear translation of the cam sleeve as effected by the drive screw results in rotation of the cam sleeve at a rate determined by the cam track so that linear translation of the cam sleeve is determined by a combination of the drive screw and rotation of the cam sleeve.

6. A variable-pitch screw driven system according to claim 5 further comprising a piston assembly that is linearly translatable in concert with the cam sleeve, the piston assembly including a piston sleeve that extends over the drive screw.

7. A variable-pitch screw driven system according to claim 6 further comprising a modulator having a bore with a chamber defined in the bore by the piston assembly wherein the piston assembly is linearly translatable in the bore to effect a fluid pressure change in the chamber.

8. A variable-pitch screw driven system according to claim 7 wherein the cam track includes a substantially axially oriented section that, in combination with the cam follower imparts substantially zero rotation to the cam sleeve during rotation of the drive screw and a sloped section that, in combination with the cam follower imparts negative rotation to the cam sleeve so that linear translation of the cam sleeve and the piston assembly is slowed when the cam follower is positioned in the sloped section as compared to when the cam follower is positioned in the substantially axially oriented section.

9. A variable screw-drive system comprising:
   a modulator forming a longitudinal bore and a port opening to the longitudinal bore;
   a wheel brake;
   a brake line extending between the port and the wheel brake;
   a piston assembly translatably carried within the bore and in combination with the modulator defining a chamber within the bore, the chamber being open to the port and the piston assembly including a piston sleeve;
   a rotatable drive screw extending into the bore and being extendible into the piston sleeve;
   a cam sleeve engaging the piston assembly and being linearly translatable within the bore in response to rotation of the drive screw and being disposed about the drive screw with a nut section engaging the drive screw through a plurality of interposed ball bearings; and
   a cam follower fixed to the modulator;
   wherein the cam sleeve includes a cam track within which the cam follower is disposed wherein the cam track includes a substantially axially oriented section that, in combination with the cam follower imparts substantially zero rotation to the cam sleeve during rotation of the drive screw and a sloped section that, in combination with the cam follower imparts negative rotation to the cam sleeve so that linear translation of the cam sleeve and the piston assembly is slowed when the cam follower is positioned in the sloped section as compared to when the cam follower is positioned in the substantially axially oriented section.

10. A variable screw driven system according to claim 9 wherein the piston sleeve is engaged with the cam sleeve through an interposed bearing so that the cam sleeve is rotatable relative to the piston assembly and wherein the piston assembly and the cam sleeve translate linearly in concert.

11. A variable screw driven system according to claim 10 wherein the cam sleeve and the piston assembly are linearly translatable in the longitudinal bore effecting a fluid pressure change in the chamber.

* * * * *